Patented Apr. 10, 1923.

1,451,540

UNITED STATES PATENT OFFICE.

WILLIAM A. FRANCE, OF PHILADELPHIA, PENNSYLVANIA.

MANUFACTURE OF SELF-HARDENING REFRACTORY ARTICLES.

No Drawing.   Application filed December 22, 1920.   Serial No. 432,533.

*To all whom it may concern:*

Be it known that I, WILLIAM A. FRANCE, a citizen of the United States, residing at Philadelphia, in the county of Philadelphia and State of Pennsylvania, have invented certain new and useful Improvements in the Manufacture of Self-Hardening Refractory Articles, of which the following is a specification, reference being had therein to the accompanying drawing.

This invention relates to the manufacture of refractory articles and, particularly, of bricks or blocks used to line steel furnaces and like structures involving an intense heat.

Bricks that are now employed for such purposes are usually manufactured by combining certain selected materials which, when mixed, are rendered into a plastic condition, then molded, then dried, and finally fired at high temperature. That is to say, under present-day practice, certain materials are ground or otherwise reduced to an approximately pulverulent condition and then molded into brick sizes, whereupon (after a period of drying) the articles are set in kilns wherein they are burned with coal or other fuel from five to eight days. This method of manufacturing involves the very considerable loss of time required for the drying of the articles sufficiently to permit them to be set in the kilns; then there is the further period consumed in the burning; and then there is the still further consumption of time involved in the cooling of the burned articles; these various steps requiring several days; and besides the element of time involved, there is the expense of setting and burning the articles as well as the cost of the fuel utilized to effect the burning, not to mention the continuing expense required in the upkeep of the kilns.

I have found that, by a different method of manufacture, refractory articles can be made self-drying and thereby obviate the necessity of firing the same, with the attendant expense and loss of time already mentioned. The present invention is therefore predicated upon the discovery that, by utilizing certain chemical elements and effecting a combination of one of these with the basic material used in the manufacture of the articles, such articles will self-harden to a degree equal to that resulting from the usual firing in a kiln. As a result of considerable experimentation, I have determined that chlorid of magnesium, when in a particular condition, will effect a hardening action such that in a mass which includes magnesite, for instance, kiln firing is absolutely avoided, while the product possesses the required degree of hardness to permit its use for lining steel furnaces. In this connection, it may here be explained that the magnesium chlorid, before being mixed with the magnesite, must be reduced from its natural, solid form to a fluid condition.

My invention, it will now be understood, resides in the new method of manufacturing and in the resultant product, hereinafter described.

Where firebrick, and similar articles, are to be made with the magnesite as the basic material, this is first prepared by grinding and burning it so that it is then in the condition of ground burned dead magnesite. While the magnesite may be in the amorphous form; nevertheless I generally utilize magnesite in the crystalline form because that is mostly desired by steel mills and furnace operators. Where the hardening agent is magnesium chlorid, this is fused in a suitable receptacle and this is subjected to a heat approximating 1250° Fahrenheit until it is reduced from solid to liquid form. This step of fusing the magnesium chlorid occupies approximately five minutes, but may be hastened by the application of a higher degree of heat. As soon as, or just before, the magnesium chlorid reaches a boiling condition, the application of the heat is arrested, whereupon the liquid mass is permitted to cool, for a very short time, or until the boiling magnesium chlorid becomes settled. Then, to a quantity of the ground dead burned magnesite, equalling (say) 500 pounds, a relatively small quantity (say from 3% to 5% by weight) of the liquid magnesium chlorid is mixed. Then a small quantity of water is added to the resultant, sufficient to render the mixture plastic. I have found by experiments and tests that when the magnesite is combined with the fused magnesium chlorid in liquid state and then moistened with water, a recognizable chemical action occurs: The resultant is a combination which may be called oxychlorid. The magnesia or magnesium oxid in the magnesite, with the impurities (such as iron), combine with the magnesium chlorid in the presence of water and the resulting action is an oxy-chlorid compound with magnesite. This may be expressed as

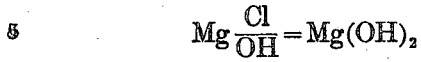

and water. Following this stage of the operation, the mass is molded into bricks or blocks of appropriate form and dimensions, whereupon the bricks are subjected to a pressure of, say, 5,000 pounds, for a couple of seconds or so. Being then relieved from this pressure, the molded bricks are permitted slowly to dry, as in the atmosphere, for about four days, whereupon the brick is sufficiently hard to be used without further treatment. The drying step, it will be understood, is accomplished without artificial heat, though such drying may be expedited, if desired, by employing heated air; but, in no case, is there any "firing" or burning of the brick to effect its hardening. It will be understood that, in carrying out my improved method of brick manufacture, I combine a material (such as magnesite) with a hardening agent, such as magnesium chlorid, it being an essential feature of the method that the chlorid be in liquid condition when admixed with the magnesite; also, that it is a further feature of the invention to moisten the mixture of the magnesite and chlorid with water or similar liquid to effect a chemical combination, such as that already specified; and, further, that it is of the essence of the invention to avoid burning the brick to effect its hardening.

While I have hereinabove described the method as for the production of bricks or blocks for furnace linings and the like; nevertheless, it is to be understood that the method is likewise useful for the manufacture of other articles, the form and type of which is determined by the molding or shaping of the same according to their intended use.

While I have herein specifically referred to magnesium chlorid, in a liquid form, as the hardening agent; nevertheless, it is to be understood that the invention contemplates the use of other elements having the same characteristics as magnesium chlorid and capable of being rendered into a fluid or semi-fluid condition.

What I claim is:

1. The method of manufacturing refractory articles, such as furnace-lining bricks, which consists in mixing magnesite with other elements including magnesium chlorid in a molten condition, forming the same, and finishing the resultant by subjecting it to the drying action of air and without burning.

2. The method of manufacturing refractory articles, such as furnace-lining bricks, which consists in mixing ground dead burned magnesite with molten magnesium chlorid, then moistening the same to render the mass of proper consistency, then forming the same, as in molds, and finally finishing the resultant by subjecting it to the drying action of atmospheric air to render the article hard, without firing.

3. The method of manufacturing refractory articles which consists in mixing pulverized dead burned magnesite with a relatively small quantity of magnesium chlorid in molten condition, moistening the same with a liquid to chemically combine these two elements and to render the same of proper consistency, and then subjecting the resultant to the drying action of atmospheric air to harden the article.

4. The method of making self-hardening refractory articles which consists in subjecting magnesium chlorid to the action of heat to liquefy it, then mixing it with dry burned magnesite, then moistening the mass with water, then molding the plastic resultant, and then allowing the molded article to dry in the air and become self-hardening.

5. The method of manufacturing self-hardening refractory articles which consists in fusing magnesium chlorid, then mixing this with ground dead burned magnesite, then adding a moistening element to the mixture, then molding the plastic mass to shape it, and finally hardening the same by subjecting it to the drying action of air without firing the article.

6. The method of manufacturing self-hardening refractory articles which consists in subjecting magnesium chlorid to the action of heat at high temperature to convert it from solid to fluid conditions; then cooling the same for a predetermined period until the boiling magnesium chlorid becomes settled; then mixing a relatively small quantity of the liquefied chlorid with ground dead burned magnesite; then moistening the same with a liquid; then subjecting the plastic mass to a high pressure; and finally effecting a drying of the resultant articles to harden the same with avoidance of firing or burning.

7. The method of manufacturing self-hardening refractory bricks and similar articles which consists in the combining with 500 pounds of dead-burned magnesite of approximately 5% of magnesium chlorid in a molten condition, moistening the same with water, then subjecting the resultant to a high pressure, and finally effecting a drying of the pressed article by subjecting the same to atmospheric air.

8. The method of manufacturing self-hardening fire bricks and similar articles which consists in applying to magnesium chlorid a heat of approximately 1250° Fahrenheit to liquefy the same, then cooling the same to a predetermined condition, then mixing approximately 5% of this liquefied chlorid with about 500 pounds (by weight) of ground dead burned magnesite; then subjecting the plastic mass to a high pressure for a predetermined period, and finally subjecting the pressed article to the slow drying action of atmospheric air for a predetermined period.

9. The method of manufacturing refractory liners for furnaces and the like which consists in mixing calcined magnesite with magnesium chlorid reduced to molten condition, then moistening the resultant product, and then setting the mass by subjecting it to the drying action of air and without firing.

10. The method of manufacturing refractory bricks and the like which consists in melting megnesium chlorid, then combining it with calcined magnesite, the chlorid being in relatively small proportion to the magnesite, and then setting the resultant product by subjecting the same to the drying action of air.

11. The method of manufacturing refractory articles, such as furnace bricks, which consists in mixing calcined magnesite with molten magnesium chlorid, adding to the resultant product water to give consistency to the mass and to effect a chemical combination between the elements thereof, then molding the resultant product, and, finally, setting the molded articles by subjecting them to the action of air, and without firing the same.

12. As an article of manufacture, a refractory article produced by combining calcined magnesite and molten magnesium chlorid, forming the mass while in a plastic condition, and setting the same hard without burning.

13. As an article of manufacture, a refractory article produced by combining calcined magnesite, molten magnesium chlorid, and water; then forming the mass while in a plastic condition; and then allowing the same to set hard without burning.

In testimony whereof I affix my signature in presence of two witnesses.

WILLIAM A. FRANCE.

Witnesses:
 JOHN A. ROSS,
 JOHN W. SLOAN.